Patented Apr. 26, 1938

2,115,030

UNITED STATES PATENT OFFICE 2,115,030

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application June 4, 1937, Serial No. 146,524

19 Claims.  (Cl. 8—5)

This invention relates to aryl azo compounds. More particularly it relates to aryl azo derivatives of malonylmalonamide and the application of the nuclear non-sulfonated aryl azo derivatives of malonylmalonamide for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The azo compounds of our invention are represented by the following formulae:

*Formula 1*

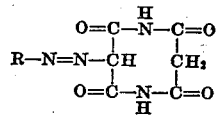

and

*Formula 2*

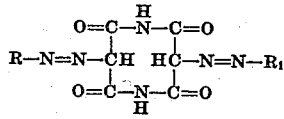

wherein R and $R_1$ represent the same or different aryl nuclei. Advantageouly R and $R_1$ represent aryl nuclei of the benzene series.

The azo compounds of our invention can be prepared by diazotizing an arylamine and coupling the diazonium compound formed with malonylmalonamide in an alkaline medium.

Malonylmalonamide may be prepared as described in Journal of the Chemical Society, volume 99, page 615. (1911).

As apparent from Formula 2, one mole of malonylmalonamide is capable of coupling with two moles of a diazotized arylamine. A compound having the general Formula 1 is formed, to the substantial exclusion of a compound having the general Formula 2, when one molecular weight of malonylmalonamide is caused to couple with an equivalent molecular weight of a diazotized arylamine. As indicated above, the coupling is selective in that the combining power of one of the reactive methylene groups of the malonylmalonamide is fully used up before appreciable coupling occurs at the second reactive methylene group. To form compounds having the general Formula 2, wherein R and $R_1$ are the same, preferably, the malonylmalonamide and diazotized arylamine should be present in the proportions of about one mole of malonylmalonamide to about two moles of the diazotized arylamine and the coupling reaction should be continued until completed. In any event coupling should be continued until formation of the disazo compound takes place where compounds of the general Formula 2 are desired.

To form compounds of the general Formula 2 wherein R and $R_1$ are different aryl nuclei a mono azo aryl compound of malonylmalonamide is first formed following which it is coupled with a diazotized arylamine different from that employed to form the mono azo compound.

1-amino-2-methoxy-4-nitrobenzene and 1-amino-2-nitro-4-chlorobenzene, o-anisidine and 1-amino-2-nitro-4-chlorobenzene and o-chloroaniline and p-nitroaniline, for example, are representative of the combination of amines that may be employed in this connection.

The nuclear non-sulfonated azo compounds of our invention constitute a valuable class of dyes suitable for the dyeing or coloration of material made of or containing an organic derivative of cellulose. By means of the non-sulfonated azo compounds, dyeings may be produced which are of good fastness to light and washing and which range in shade from green-yellow to red.

The nuclear sulfonated compounds of our invention possess little or no practical utility for the dyeing of organic derivatives of cellulose but may be employed for the dyeing of other materials such as cotton and wool, for example, being applied thereto by the customary methods of application. Again, it should be noted that when the compounds of our invention are to be employed for the coloration of organic derivatives of cellulose, it is generally advantageous that they contain no carboxylic acid group as this group generally affects the stability of the dyeing adversely. It should be noted that while nuclear non-sulfonated azo compounds of the general Formula 1 or the general Formula 2 may be employed for the dyeing of organic derivatives of cellulose, those compounds having the general Formula 1 have been found to be of greater utility for this purpose.

The following examples illustrate the method of preparation of the azo compounds of our invention:

Example 1

13.7 grams of o-phenetidine are dissolved in 200 cc. of water containing 25 cc. of 36% hydrochloric acid. The resulting solution is cooled to a temperature of 0–5° C. and diazotized by the addition, with stirring, of 6.9 grams of sodium nitrite dissolved in water.

17 grams of malonylmalonamide are dissolved in 300 cc. of water containing 31.8 grams of sodium carbonate. The resulting solution is cooled to a temperature approximating 0–10° C. and the diazo solution prepared above is added with stirring. Upon completion of the coupling reaction which takes place, the mixture is made acid to litmus by the addition of acetic acid and the dye compound formed is recovered by filtration, washed with water and dried. The dye has the formula:

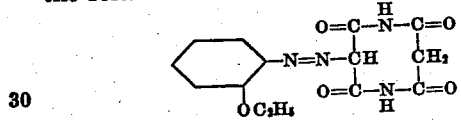

and colors cellulose acetate silk green-yellow from a water suspension.

Example 2

16.8 grams of 1-amino-2-methoxy-4-nitrobenzene are added to 200 cc. of water containing 30 cc. of 36% hydrochloric acid. The resulting solution is cooled to a temperature approximating 0–5° C. by the addition of ice and diazotized in the usual manner by the addition, with stirring, of 6.9 grams of sodium nitrite dissolved in water.

17 grams of malonylmalonamide are dissolved in 300 cc. of water containing 31.8 grams of sodium carbonate. The resulting solution is cooled to a temperature approximating 0–10° C. and the diazo solution prepared above is added with stirring. Upon completion of the coupling reaction which takes place, the mixture is made acid to litmus by the addition of acetic acid and the dye compound formed is recovered by filtration, washed with water and dried. The dye has the formula:

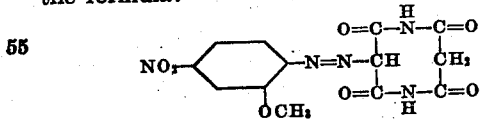

and colors cellulose acetate silk golden yellow from its suspension in water.

Example 3

34.7 grams of disodium-2-aminonaphthalene-4,8-disulfonate are dissolved in 200 cc. of water, the resulting solution is well iced and then 50 cc. of 36% hydrochloric acid are added with vigorous stirring. A concentrated solution of 6.9 grams of sodium nitrite is then gradually added with stirring and the mixture is stirred until diazotization is complete.

17 grams of malonylmalonamide are dissolved in 300 cc. of water containing 31.8 grams of sodium carbonate. The resulting solution is cooled to a temperature approximating 0–10° C. and the diazo solution prepared above is added with stirring. Upon completion of the coupling reaction which takes place, the mixture is made acid to litmus by the addition of acetic acid and the dye compound formed is recovered by filtration, washed with water and dried. The dye has the formula:

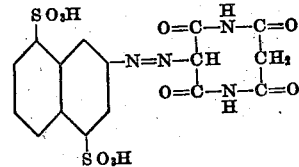

It colors wool yellow.

Example 4

13.6 grams of p-aminodimethylaniline are dissolved in 200 cc. of water containing 40 cc. of 36% hydrochloric acid. The resulting solution is cooled, by the addition of ice, to a temperature approximating 0–5° C. and diazotized by the addition, with stirring, of 6.9 grams of sodium nitrite in water.

17 grams of malonylmalonamide are dissolved in 300 cc. of water containing 31.8 grams of sodium carbonate. The resulting solution is cooled to a temperature approximating 0–10° C. and the diazo solution prepared above is added with stirring. Upon completion of the coupling reaction which takes place, the mixture is made acid to litmus by the addition of acetic acid and the dye compound formed is recovered by filtration, washed with water and dried. The dye has the formula:

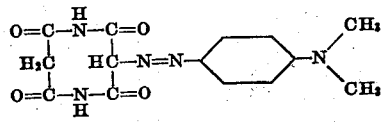

and colors cellulose acetate silk red from an aqueous suspension.

Example 5

16.7 grams of

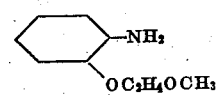

are diazotized in the usual manner.

8.5 grams of malonylmalonamide are dissolved in one liter of water containing 30 grams of sodium carbonate. Ice is added and the diazo solution prepared above is slowly added with stirring. When coupling is complete, the mixture is made acid to litmus with hydrochloric acid and the precipitated dye compound formed is recovered by filtration, washed with water and dried. The dye has the formula:

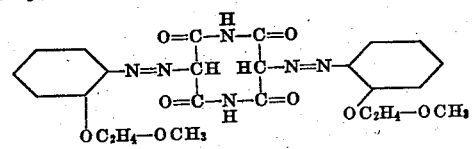

and colors cellulose acetate silk yellow from an aqueous suspension.

Example 6

16.3 grams of 1-amino-2-nitro-4-chlorobenzene are diazotized in the usual manner.

8.5 grams of malonylmalonamide are dissolved in one liter of water containing 30 grams of sodium carbonate. Ice is added and the diazo solution prepared above is slowly added, with stirring. When coupling is complete, the mixture is made acid to litmus with hydrochloric acid and the precipitated dye compound formed is recovered by filtration, washed with water and dried. The dye has the formula:

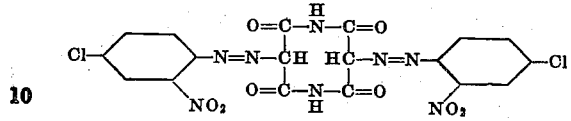

and colors cellulose acetate silk a yellow shade from an aqueous suspension.

Example 7

27.1 grams of o-methoxybenzeneazocresidine are suspended in 400 cc. of water containing 40 cc. of 36% hydrochloric acid and diazotized at a temperature approximating 20° C. by the addition, with stirring, of 6.9 grams of sodium nitrite dissolved in water.

17 grams of malonylmalonamide are dissolved in 300 cc. of water containing 31.8 grams of sodium carbonate. The resulting solution is cooled to a temperature approximating 0–10° C. and the diazo solution prepared above is added with stirring. Upon completion of the coupling reaction which takes place, the mixture is made acid to litmus by the addition of acetic acid and the dye compound formed is recovered by filtration, washed with water and dried. The dye compound has the formula:

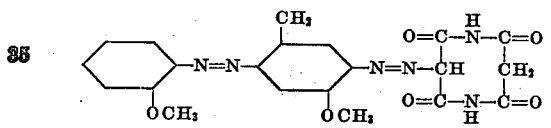

and colors cellulose acetate silk orange yellow from an aqueous suspension.

Example 8

18.6 grams of 1-sulfonic-2-amino-5-nitrobenzene are dissolved in 150 cc. of water containing 6 grams of sodium carbonate and diazotized in the usual manner. 8.5 grams of malonylmalonamide are dissolved in 100 cc. of water containing 15 grams of sodium carbonate. The resulting solution is cooled and the diazo solution prepared above is slowly added with stirring. When coupling is complete, the reaction mixture is made acid to litmus by the addition of hydrochloric acid. The dye compound formed is precipitated out by the addition of sodium chloride after which it is recovered by filtration, washed with water and dried. The dye has the formula:

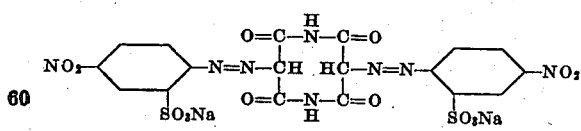

and colors silk and wool orange-yellow shades from an aqueous solution of the dye which may contain salt.

The following tabulation further illustrates the compounds included within the scope of our invention together with the color they produce on cellulose acetate silk. Monoazo compounds may be prepared by diazotizing one mole of an amine listed under the heading "Amine" and coupling with one mole of malonylmalonamide which is listed in the column entitled "Coupling component". Disazo compounds may be prepared by diazotizing two moles of an amine and coupling with one mole of malonylmalonamide. Similarly disazo compounds can be prepared by coupling one mole of malonylmalonamide with one mole of a diazotized amine and completing the coupling reaction with a mole of a second diazotized amine. The diazotization and coupling reactions may, for example, be carried out following the general procedure described in Examples 1 to 8 inclusive. The colors given in the tabulation are those for the monoazo derivatives of malonylmalonamide but the disazo compounds produce generally similar colors.

| Amine | Coupling component | Color on cellulose acetate silk |
| --- | --- | --- |
| o-Anisidine | Malonylmalonamide | Yellow. |
| p-Anisidine | do | Do. |
| o-Chloroaniline | do | Do. |
| p-Chloroaniline | do | Do. |
| p-Aminoacetophenone | do | Do. |
| p-Nitroaniline | do | Golden yellow. |
| 1-amino-2-nitro-4-chlorobenzene | do | Do. |
| α-naphthylamine | do | Yellow. |
| p-Aminodimethylaniline | do | Red. |

In order that the application of the compounds of our invention may be clearly understood, their application for the direct dyeing or coloration of materials made of or containing an organic derivative of cellulose, and more particularly cellulose acetate silk, is described hereinafter. Although the remarks are more particularly directed to the dyeing or coloring of the above mentioned materials those pertaining to temperature, the dispersing agents and the amounts of dispersing agent and dye which may be employed, for example, are of general applicability where the dye is to be applied directly to the fiber from an aqueous suspension. The general methods by which the dye compounds may be applied to the coloration of other materials are well known in the art and need not be described here.

In employing the aromatic azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dyebath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dyebath directly to the material to be colored, coloration may be effected by absorbing and diazotizing an amine on the fiber after which the dye is formed in situ by developing with malonylmalonamide.

The following examples illustrate how dyeing may be carried out in accordance with our invention. Quantities are expressed in parts by weight.

*Example A*

2.5 parts of

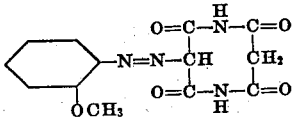

are finely ground with a dispersing agent such as soap or oleyl glyceryl sulfate and the resulting paste is dispersed in 1,000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a yellow shade of good fastness to light.

*Example B*

2.5 parts of

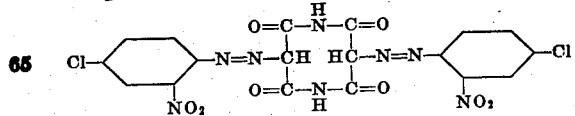

are finely ground with a dispersing agent such as soap or oleyl glyceryl sulfate and the resulting paste is dispersed in 1,000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a yellow shade of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. An azo compound selected from the class consisting of azo compounds having the general formulae:

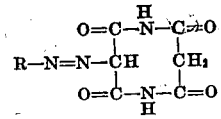

and

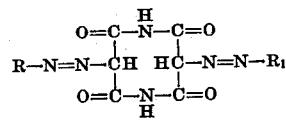

wherein R and $R_1$ each represent a member selected from the class consisting of an aryl nucleus of the benzene and naphthalene series.

2. An azo compound having the general formula:

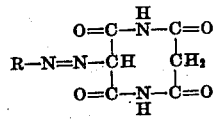

wherein R represents a member selected from the class consisting of an aryl nucleus of the benzene and naphthalene series.

3. An azo compound having the general formula:

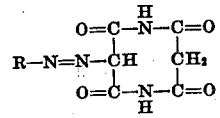

wherein R represents an aryl nucleus of the benzene series.

4. An azo compound having the general formula:

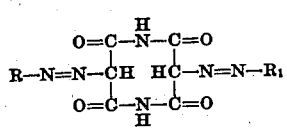

wherein R and $R_1$ each represent a member selected from the class consisting of an aryl nucleus of the benzene and naphthalene series.

5. An azo compound having the general formula:

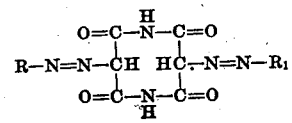

wherein R and R₁ each represent an aryl nucleus of the benzene series.

6. A process of coloring an organic derivative of cellulose which comprises applying thereto a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{R—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene and naphthalene series.

7. A process of coloring an organic derivative of cellulose which comprises applying thereto a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{R—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene series.

8. A process of coloring an organic derivative of cellulose which comprises applying thereto a dye selected from the class consisting of azo compounds having the general formula:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

wherein R represents a nuclear non-sulfonated aryl nucleus of the benzene series.

9. A process of coloring an organic acid ester of cellulose which comprises applying thereto a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{R—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene series.

10. A process of coloring a cellulose acetate which comprises applying thereto a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{R—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene and naphthalene series.

11. A process of coloring a cellulose acetate which comprises applying thereto a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{R—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene series.

12. A process of coloring a cellulose acetate which comprises applying thereto a dye selected from the class consisting of azo compounds having the general formula:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

wherein R represents a nuclear non-sulfonated aryl nucleus of the benzene series.

13. Material made of or containing an organic derivative of cellulose colored with a dye selected from the class consisting of azo compounds having the general formulae:

$$\begin{array}{c} \text{H} \\ \text{O=C—N—C=O} \\ \text{R—N=N—CH} \quad \text{CH}_2 \\ \text{O=C—N—C=O} \\ \text{H} \end{array}$$

and $$\begin{array}{c} \text{H} \\ \text{O=C—N—C=O} \\ \text{—N=N—CH} \quad \text{HC—N=N—R}_1 \\ \text{O=C—N—C=O} \\ \text{H} \end{array}$$

wherein R and R₁ each represent a member selected from the class consisting of a nuclear non-sulfonated aryl nucleus of the benzene and naphthalene series.

14. Material made of or containing an organic derivative of cellulose colored with a dye selected from the class consisting of azo compounds having the general formulae:

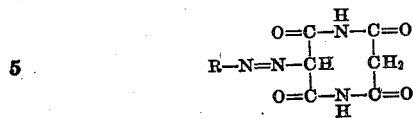

and

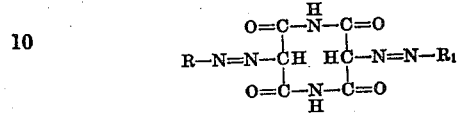

wherein R and R₁ each represent a member selected from the class consisting of a nuclear non-sulfonated aryl nucleus of the benzene series.

15. An organic derivative of cellulose colored with a dye selected from the class consisting of azo compounds having the general formulae:

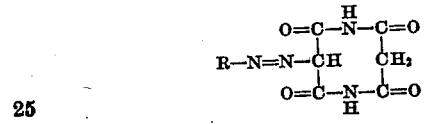

and

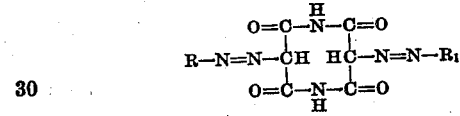

wherein R and R₁ each represent a member selected from the class consisting of a nuclear non-sulfonated aryl nucleus of the benzene series.

16. An organic derivative of cellulose colored with a dye selected from the class consisting of azo compounds having the general formula:

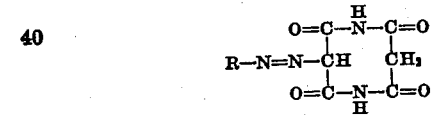

wherein R represents a nuclear non-sulfonated aryl nucleus of the benzene series.

17. A cellulose acetate colored with a dye selected from the class consisting of azo compounds having the general formulae:

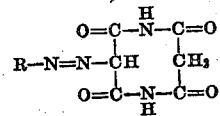

and

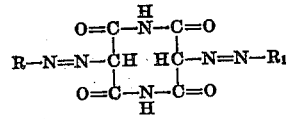

wherein R and R₁ each represent a member selected from the class consisting of a nuclear non-sulfonated aryl nucleus of the benzene and naphthalene series.

18. A cellulose acetate colored with a dye selected from the class consisting of azo compounds having the general formulae:

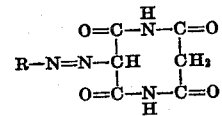

and

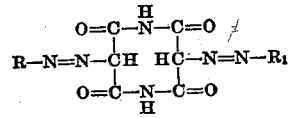

wherein R and R₁ each represent a member selected from the class consisting of a nuclear non-sulfonated aryl nucleus of the benzene series.

19. A cellulose acetate colored with a dye selected from the class consisting of azo compounds having the general formula:

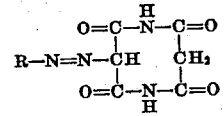

wherein R represents a nuclear non-sulfonated aryl nucleus of the benzene series.

JAMES G. McNALLY.
JOSEPH B. DICKEY.